Dec. 9, 1930.  J. HAMILL  1,784,627
APPARATUS FOR SEPARATING MOISTURE FROM VAPOR
Filed March 18, 1924  3 Sheets-Sheet 1
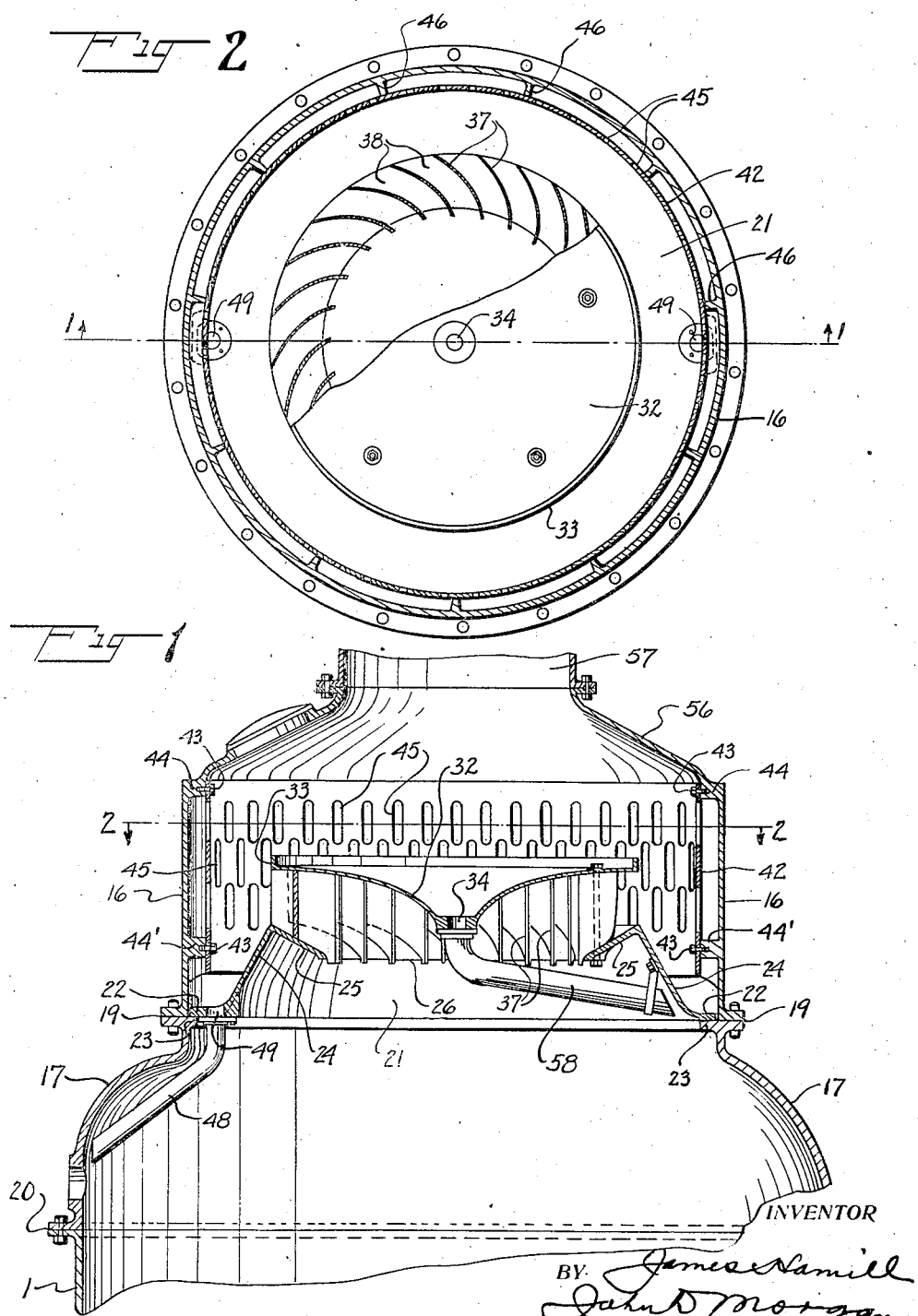

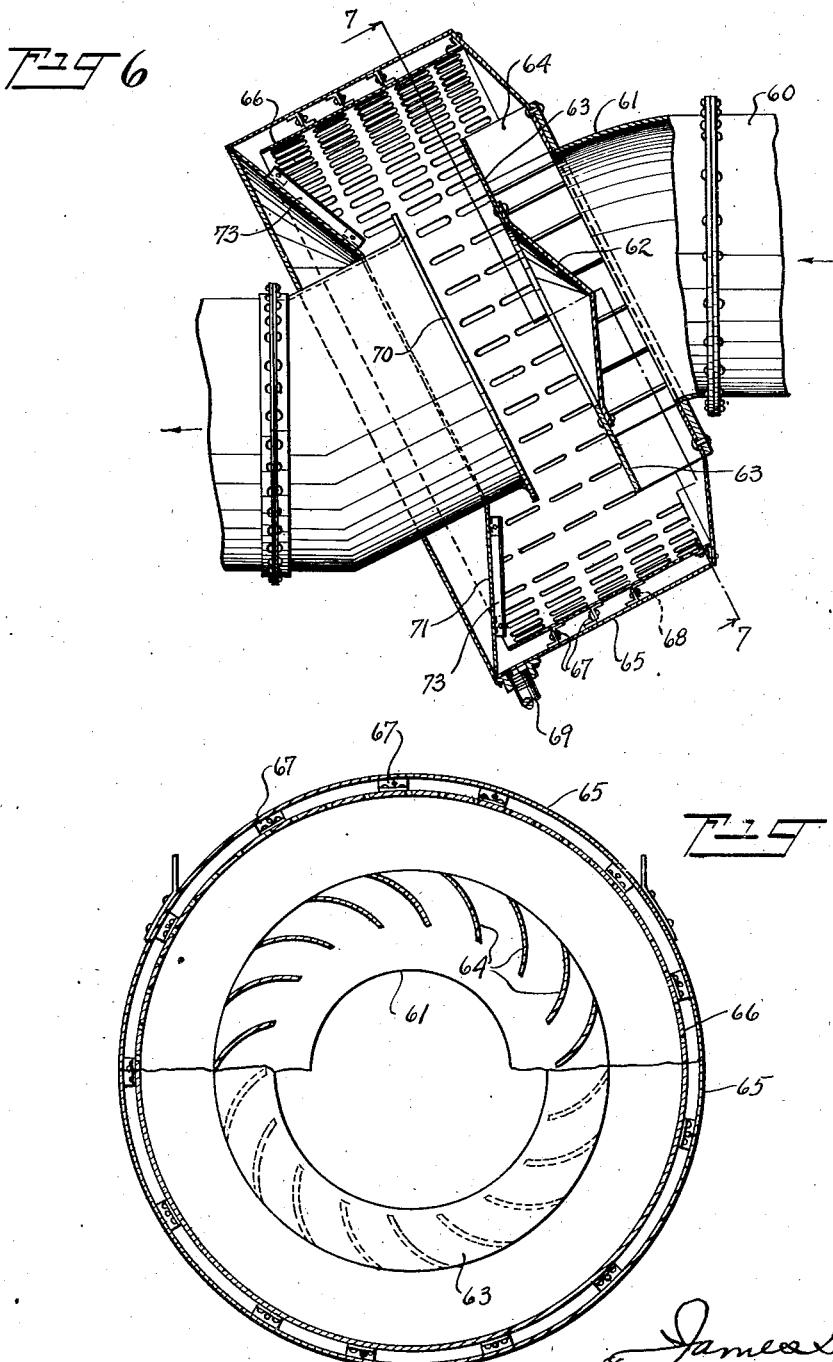

Dec. 9, 1930.  J. HAMILL  1,784,627
APPARATUS FOR SEPARATING MOISTURE FROM VAPOR
Filed March 18, 1924  3 Sheets-Sheet 3
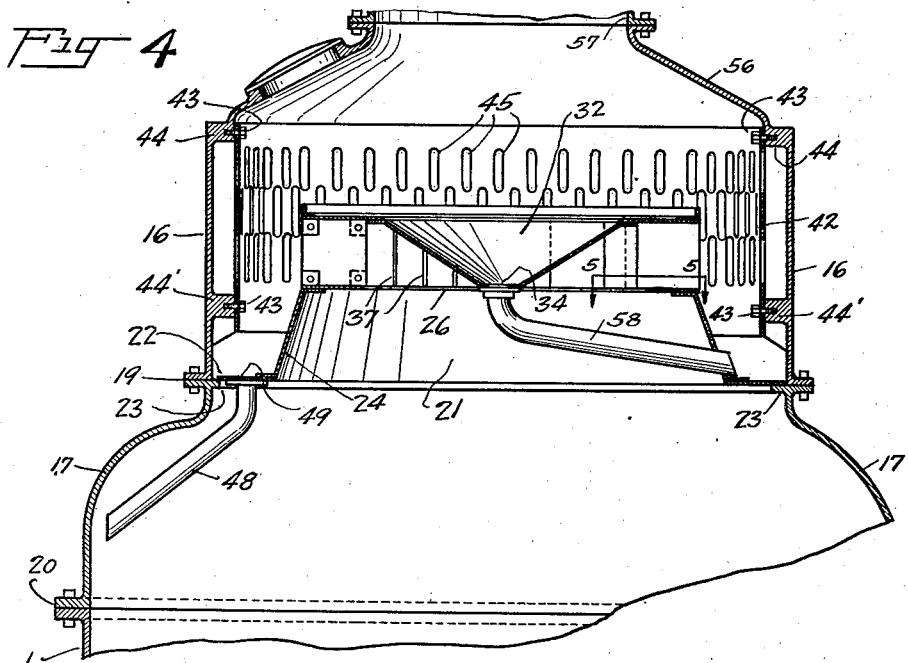
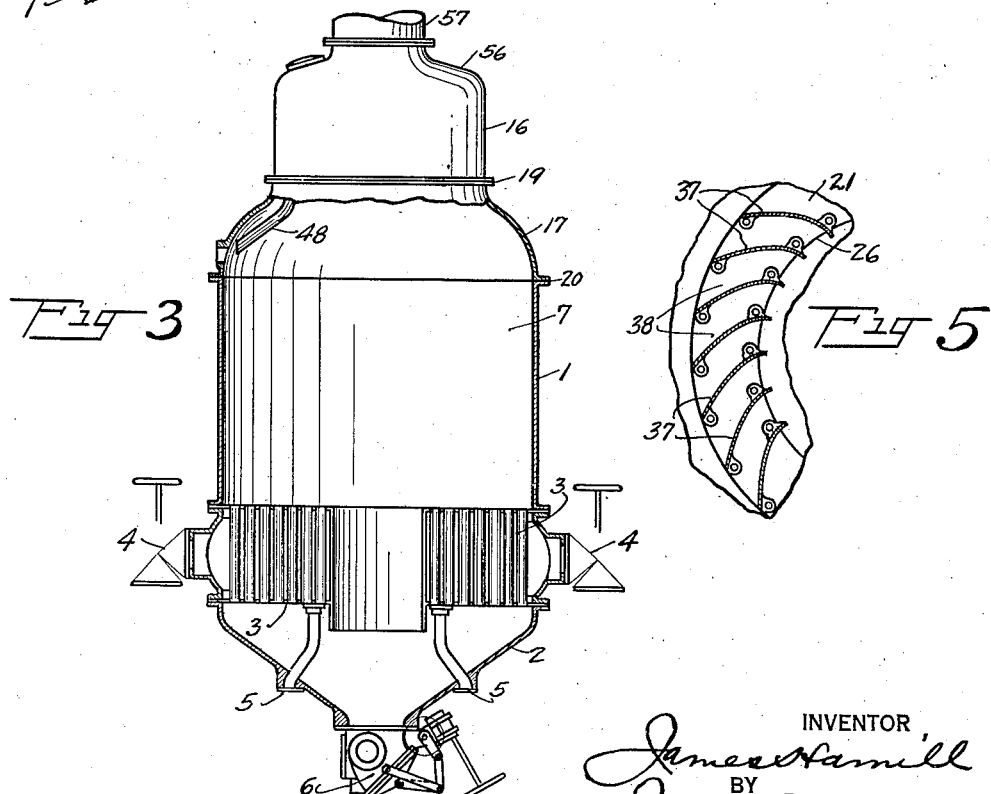
INVENTOR
James Hamill
BY
John D Morgan
ATTORNEY Patented Dec. 9, 1930

1,784,627

UNITED STATES PATENT OFFICE

JAMES HAMILL, OF EAST ORANGE, NEW JERSEY

APPARATUS FOR SEPARATING MOISTURE FROM VAPOR

Application filed March 18, 1924. Serial No. 700,173.

The invention relates to a novel process and device for separating moisture from the vapor generated in vacuum pans, and more especially to such a process and device operating by controlling the direction and velocity of the vapor generated by the vacuum pan.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Fig. 1 is a fragmentary, central, vertical section through the upper part of a vacuum pan, and shows a structure embodying the invention, and is taken substantially on line 1—1 of Fig. 2;

Fig. 2 is a full horizontal section, with parts broken away, taken substantially on line 2—2 of Fig. 1;

Fig. 3 is a central, vertical section through a vacuum pan, with parts in elevation, showing the application of the invention thereto;

Fig. 4 is a view similar to Fig. 1, but showing a modified structure;

Fig. 5 is a fragmentary, horizontal section, taken substantially on line 5—5 of Fig. 4;

Fig. 6 is a longitudinal central section through another form or adaptation of my invention; and Fig. 7 is a transverse section on line 7—7 of Fig. 6.

The present invention is directed primarily to removing and saving all the juice, syrup or other solution which may be carried over in minute particles in the vapor from the evaporation in a vacuum pan, and to remove such particles in the upper part of the vacuum pan by controlling the direction and velocity, and otherwise governing the stream or column of vapor generated and set in upward motion by the evaporation within the pan.

The column or stream of vapor traveling upwardly in the vacuum pan is accelerated and is inclined horizontally or toward the horizontal, and is also, and preferably just subsequently, directed into a circular, or approximately circular, path, and at the same time its velocity is further increased.

The circular, or equivalent rotary, motion combined with the velocity separates the particles of moisture or other liquid, such as the juice or syrup, from the vapor, and the moisture particles are permitted to escape radially or tangentially, or outwardly, while the vapor is kept in its circular path. The greater part of the moisture is thus separated from the vapor.

To separate more completely the moisture content of the vapor, the stream or column is directed inwardly or toward or nearer the center of the circular part of its path and the velocity thereof is preferably concurrently decreased. Thereby further moisture is separated therefrom, and the vapor is left practically dry to proceed to the condenser or to another vacuum pan or effect to be used for causing the evaporation therein in the usual manner.

The foregoing general description and the following detailed description, it will be understood, are exemplary and explanatory of the invention, but are not restrictive thereof.

Referring now in detail to the embodiment of the invention illustrated by way of example in the accompanying drawings, it is shown applied to a vacuum pan of the calandria type (Fig. 3), although it is likewise applicable to those of the coil type, and to evaporator cells of the vertical tube type in which there is a vapor space between the liquor level and the moisture separating and saving device. It will be understood that the showing of Fig. 3 is to a very large extent conventional and more or less diagrammatic, and is not necessarily proportional or symmetrical.

The cylindrical body 1 of the vacuum pan has the usual lower inverted conical portion 2, within which is the calandria 3, having an inlet pipe 4 for the steam or heating vapor and a discharge pipe 5 therefor. A discharge valve 6 for sugar and other products of the evaporation is provided. Many details of the structure are omitted for the sake of clearness. There is preferably provided a steam or vapor space 7 between the liquid in the pan and the moisture separating and saving device, for the first separation of the major part of the upwardly displaced liquid due to the evaporation or boiling.

The present preferred embodiment of the device or apparatus which is useful and efficient in carrying out the process comprises a cylindrical casing 16, which is mounted upon a dome 17, the dome resting upon the upper edge and closing the top of the vacuum pan 1. These parts may be joined in any suitable manner, and are shown connected together, respectively, by bolted butt flange joints 19 and 20.

Within the lower part of the casing 16 are the vapor stream accelerating means. This comprises in the embodied form, what may be conveniently styled a "bottom plate" 21, which collects and accelerates the ascending column of vapor. This plate comprises a horizontal, outwardly-extending, annular flange 22, resting upon and supported by an inwardly-extending, annular flange 23 formed on the upper edge of the dome 17. Integral with this flange 22 of the bottom plate 21 is a conical inwardly and upwardly extending baffle 24. From the upper circular edge of this baffle, the plate is inclined inwardly and downwardly, in conical form, having a lip 25, and terminates in a relatively large central circular aperture 26, through which the column of vapor passes upwardly.

Located above, and separated from, the bottom plate 21 is a "top plate" or "baffle plate" 32, which has a circular periphery 33, and therefrom curves inwardly and downwardly to a central outlet 34. This plate effects a plurality of functions, the underface thereof serving to deflect and outwardly guide the ascending column of vapor, and the upper side thereof serving to gather a part of separated moisture.

Means are provided for imparting rotary and preferably circular motion to the vapor stream, to centrifugally separate the moisture from the vapor. As embodied, these means utilize in part the structure previously described. As further embodied, between the inwardly and downwardly inclined annular or conical top part 25 of the bottom plate 21 and the underside of the baffle plate 32 are a plurality of guiding partitions or vanes 37, which are vertically disposed between the plates, and are or may be of approximately fragmentary evolute form, although the form thereof may be varied greatly within the scope of the invention. These guide plates or vanes 37, spaced preferably equally apart and parallely arranged about the entire circle between the bottom plate and the baffle plate, constitute a series of passages for deflecting and directing the stream or column of vapor into a circular path, and at the same time increasing its velocity.

The stream or column of vapor generated in the lower part of the vacuum pan ascends within the pan, and is accelerated by the contraction of the dome 17 and of the bottom plate 21, and passes upwardly through the opening 26 with greatly increased velocity. It then impinges upon the lower face of the baffle plate 32 and is thereby directed outwardly toward the horizontal, and passing through the passages 38 between the vanes 37 is given a very rapid circular motion about the outside of the mechanism just described and within the circular casing 16. The circular motion of the vapor at the relatively high velocity separates out by centrifugal action the particles or drops of moisture which have been carried upwardly from the evaporating liquid in the lower part of the vacuum pan.

Means are provided by the invention for permitting the drops of moisture so separated to escape in a general radial or tangential or at least outward direction, while restraining the vapor in its circular path. In the embodied form thereof, there is provided within the circular wall of the casing 16 a perforate wall 42, spaced away from the wall 16. Wall 42 is supported in a suitable manner, as by means of tap bolts 43 passing through the wall and into a top ring 44 and bottom lugs 44' formed on, and inwardly projecting from, the inner side of the casing 16.

The openings in the inner casing 42 are designed and adapted to permit the escape of the drops of moisture while permitting the entry of substantially none of the rapidly swirling current of vapor. As shown in Figs. 1 and 4, elongated and relatively narrow openings 45 are arranged in side by side annular series entirely around the casing plate 42, these openings being relatively narrow. The particular structure may of course be greatly varied, and vertical bars, wire mesh or plates with cupped or cockled surfaces may be employed, as well as other particular forms of detail structure.

Means are further provided, in the present preferred form, to assist in the deposition and downward travel of the drops or particles of moisture which have passed through the openings 45. As embodied, a series of ribs 46 are vertically arranged and project inwardly from the inner face of the casing 16 and abut against the outer face of the inner casing 42, thereby forming chambers or compartments therebetween, which are open at the bottom, but are closed at the sides as described, and are also closed at the top by the form of the upper part of the casing 16 as best shown in Fig. 1.

The drops of moisture passing through the openings 45 adhere upon the inner face wall of the casing 16, are directed downwardly by the partitions 46, and pass into the annular trough formed by the exterior face of the flange 22 of the bottom plate 21 and by the inner face of the outer casing 16. A drain pipe 48 carries the liquid back from a port 49 and discharges this relatively cool liquid at or adjacent to the wall of the vacuum pan at the most advantageous point in the circulation system of the pan.

Means are provided by the invention for causing the rapidly swirling column or stream of vapor to be deflected upwardly and inwardly radially, or at least toward the center of its circular motion, and at the same time permitting it to expand and thereby to decrease in velocity. This action results in the precipitation of further moisture from the vapor just prior to its passing out from the mechanism to the condenser, or to another vacuum pan to heat same or otherwise.

As embodied and constructed, the casing 16, and the inner casing 42 extend upwardly a substantial distance above the top plate or baffle plate 32, and the chamber 16 terminates in an inwardly and upwardly inclined conical part 56, which discharges into pipe 57, leading away to another vacuum pan or to the condenser, as already indicated, and creating suction or vacuum to draw the vapor column or current. As already described the upper face of the baffle plate 32 is adapted to receive the moisture precipitated from the vapor column or stream at this point, due to its deceleration and cooling, and to collect it centrally thereof. It is discharged thence through the opening 34 into a pipe 58, which in turn discharges it toward the outer wall of the vacuum pan.

The structure shown in Figs. 4 and 5 is practically the same as, or similar to, that shown in the preceding figures except that the structure consists of plates, while in the preceding figures it is largely of cast metal.

It will be understood that while the vapor stream is described as being moved in a circular path, that various rotary movements are equivalent, although the circular motion is functionally more efficient and mechanically more convenient, and the claims will be so understood.

In Figs. 6 and 7 the invention is shown installed in a vapor conveying pipe, and it may obviously be used in either an inclined or a horizontal pipe as may be most convenient and efficient in any particular case.

In said figures, the vapor pipe 60 is shown with an inclined portion 61 and with the save-all or moisture separator at an angle. In said embodied form, the deflector proper is provided with a conical plate 62 upon which the moisture laden vapor impinges. Surrounding this conical plate 62 is an annular top plate 63. Arranged in annular series about this plate is the series of vanes 64, which are installed around the inlet. The separator sheet 65 is fitted with cylindrical internal perforated plates 66, supported on angle irons 67. These angle irons are continuous except for an opening 68 at the lowest side of the shell 65, to permit the separated liquid to drain to the outlet 69.

The vapor outlet pipe 70 is arranged centrally on an inverted cone 71, which forms one side of the separator. The space contained by angle between the cone 62 and the top part of shell 65 is removed from the path of the liquor flow and forms a quiescent pocket for the separation of the liquid from the vapor. Perforated plates 73 fitted over the cone by means of radial angles assist in the separation of the liquids and drainage of same to the drain outlet 69. The pipe 70 forming the vapor outlet is extended inside the inverted cone 71, and flares at the edge so as to prevent the separated liquid from being swept off with the outgoing vapors.

In action the separator will operate as follows:

Vapor will be introduced at the inlet and given a rotary motion by the vanes 64 at the same time as it is liberated into the annular space between the plate 63 and the perforated lining 66. Owing to the proportioning of this annular space, the velocity is reduced whilst the centrifugal force will throw the separated liquid against the perforated lining 66. The angle irons 67 are substantially continuous so that liquid will not be swept through the perforations and back again into the vapor space, whilst being inverted they will form gutters for conducting the liquid to the bottom of the separator adjacent to the drain outlet 69. The vapor inflowing from the annular space between 63 and 66 to the vapor outlet, is subject to a change of direction as well as inward concentric motion against the action of the centrifugal force, so that contained liquids will be left behind, and allowed to settle in the annular space formed between the cone 71 and inner lining 66. Suitable means are provided to drain the separator continuously at the outlet 69 whilst under vacuum.

It will thus be clear that the operation of the device in this form is very similar to that employed in the upper part of an evaporating device, as precedingly described.

It is to be noted that in my invention the vapor space 7 between the liquid in the pan and the moisture separating and saving device is relatively large, which permits the first and major separation of the moisture from the vapor; comparatively little of the liquid is carried off with the vapor, and it is this relatively small portion of liquid that is separated from the vapor in the separating and saving device.

It is further to be noted that the inwardly extending lip 25 of the baffle plate 24 will prevent most of the splash working into the separating and saving device.

The invention in its broader aspects is not limited to the specific mechanisms shown and described but departures may be made therefrom within the scope of the accompanying claims without departing from the principles of the invention and without sacrificing its chief advantages.

What I claim is:—

1. An apparatus for separating entrained liquid from the vapor generated in an evaporator including in combination a chamber for the passage of the travelling column of vapor and entrained liquid, means for deflecting said column away from its normal direction of flow, means for increasing the velocity of the vapor and entrained liquid and for directing it along a curved path in the chamber, and means along the periphery of said path for collecting the liquid separated from the vapor by the centrifugal action without diverting the vapor from its curved path.

2. An apparatus for separating entrained liquid from the vapor generated in an evaporator including in combination a chamber for the passage of the travelling column of vapor and entrained liquid, means for deflecting said column away from its normal direction of flow, means for increasing the velocity of the vapor and entrained liquid and for directing it along a curved path in the chamber, and means along the periphery of said path for collecting the liquid separated from the vapor by the centrifugal action without diverting the vapor from its curved path comprising a zone along the periphery of said path defined by the inner surface of the chamber wall and an inner smooth perforated plate separated therefrom.

3. An apparatus for separating entrained liquid from the vapor generated in an evaporator including in combination a chamber for the passage of the travelling column of vapor and entrained liquid, means in the chamber for deflecting said column out of its forward path, vanes cooperating with said deflecting means for directing the vapor and liquid in a substantially circular path while accelerating its velocity, and a collecting zone along the periphery of the curved path adapted to receive the liquid separated from the vapor while substantially preventing entry of the vapor, comprising a smooth perforated plate concentric with the chamber wall and separated therefrom and a shoulder extending inwardly from the chamber wall at one end of the plate for sealing the space between the plate and the chamber wall at that point, so as to prevent the circulation of vapor therebetween.

4. An apparatus for separating entrained liquid from the vapor generated in an evaporator including in combination a chamber for the passage of the travelling column of vapor and entrained liquid, means in the chamber for deflecting said column out of its forward path, vanes cooperating with said deflecting means for directing the vapor and liquid in a substantially circular path while accelerating its velocity, and a plurality of collecting recesses along the periphery of the curved path adapted to receive the liquid separated from the vapor while substantially preventing entry of the vapor, defined by the inner surface of the chamber wall, a smooth perforated plate concentric thereto and separated therefrom, a member at one end of the plate for sealing the space between the plate and the chamber wall at that point, and a plurality of spaced-apart ribs between the chamber wall and the plate.

5. An apparatus for separating entrained liquid from the vapor generated in an evaporator including in a combination a chamber for the passage of the travelling column of vapor and entrained liquid, means for deflecting said column away from its normal direction of flow, means for increasing the velocity of the vapor and entrained liquid and for imparting a rotary motion thereto, means for collecting the liquid separated from the vapor by the centrifugal action while permitting the unimpeded passage of the vapor past said collecting means, means for permitting the expansion and deceleration of the vapor and means for collecting the additional liquid precipitated from the vapor.

6. An apparatus for separating entrained liquid from the vapor generated in an evaporator including in combination a chamber for the passage of the travelling column of vapor and entrained liquid, means for deflecting said column away from its normal direction of flow, means for increasing the velocity of the vapor and entrained liquid and for imparting a rotary motion thereto, and means for collecting the liquid separated from the vapor by the centrifugal action while permitting the unimpeded passage of the vapor past said collecting means, means for redirecting the vapor into its normal rectilinear path, an expansion space to decelerate the vapor, and means to collect the moisture precipitated from the decelerated vapor.

7. An apparatus for separating entrained liquid from the vapor generated in an evaporator including in combination a vertically disposed, substantially cylindrical chamber for the passage of the vapor and liquid, means in the chamber for deflecting toward the horizontal the upwardly travelling column of vapor and liquid, a liquid collecting zone with a substantially cylindrical, smooth perforated screen concentric with and separated from the inner surface of the chamber walls, and means disposed centrally of said screen for directing streams of vapor and liquid against the screen with a whirling motion so that the liquid passes through the perforations into the collecting zone while the vapor passes by the screen.

8. An apparatus for separating entrained liquid from the vapor generated in an evaporator including in combination a substantially cylindrical chamber for the passage of the vapor and liquid, means to direct the vapor and liquid in a swirling circular path through the chamber, a collecting chamber adjacent the outer periphery of the vapor path having a smooth surfaced, multi-apertured inner wall adapted to permit the entry of the liquid separated from the vapor by the centrifugal action while substantially excluding the entry of any vapor, and means for directing the vapor inwardly from its circular path and for decelerating the vapor to further separate liquid therefrom.

9. An apparatus for separating entrained liquid from the vapor generated in an evaporator including in combination a substantially cylindrical chamber for the passage of the vapor and liquid, means to direct the vapor and liquid in a swirling circular path through the chamber, a collecting chamber adjacent the outer periphery of the vapor path having a smooth surfaced, multi-apertured inner wall adapted to permit the entry of the liquid separated from the vapor by the centrifugal action while substantially excluding the entry of any vapor, means for directing the vapor inwardly from its circular path and for decelerating the vapor to further separate liquid therefrom and means for gathering the moisture precipitated from the decelerated vapor.

In testimony whereof, I have signed my name to this specification.

JAMES HAMILL.